(12) United States Patent
Fujiwara (10) Patent No.: US 11,493,352 B2
(45) Date of Patent: Nov. 8, 2022

(54) INFORMATION PROCESSING SYSTEM

(71) Applicant: IHI CORPORATION, Tokyo (JP)

(72) Inventor: Eiichiro Fujiwara, Tokyo (JP)

(73) Assignee: IHI CORPORATION, Tokyo (JP)

( * ) Notice: Subject to any disclaimer, the term of this patent is extended or adjusted under 35 U.S.C. 154(b) by 324 days.

(21) Appl. No.: 16/757,652

(22) PCT Filed: Dec. 7, 2018

(86) PCT No.: PCT/JP2018/045143
§ 371 (c)(1),
(2) Date: Apr. 20, 2020

(87) PCT Pub. No.: WO2019/159509
PCT Pub. Date: Aug. 22, 2019

(65) Prior Publication Data
US 2020/0326196 A1      Oct. 15, 2020

(30) Foreign Application Priority Data

Feb. 13, 2018   (JP) .............................. JP2018-023146

(51) Int. Cl.
*G01C 21/34* (2006.01)
*B60L 58/13* (2019.01)
*B60L 53/62* (2019.01)

(52) U.S. Cl.
CPC .......... *G01C 21/3469* (2013.01); *B60L 53/62* (2019.02); *B60L 58/13* (2019.02)

(58) Field of Classification Search
CPC ...... G01C 21/3469; B60L 53/62; B60L 58/13
USPC ........................................................ 701/533
See application file for complete search history.

(56) References Cited

U.S. PATENT DOCUMENTS

| | | | |
|---|---|---|---|
| 8,156,363 B2 * | 4/2012 | Kobayashi | G06F 1/3203 713/340 |
| 2010/0076825 A1 | 3/2010 | Sato et al. | |
| 2012/0078553 A1 * | 3/2012 | Kuroda | G01C 21/32 702/63 |
| 2012/0161692 A1 | 6/2012 | Kobayashi et al. | |
| 2012/0271723 A1 | 10/2012 | Penilla et al. | |
| 2014/0225561 A1 | 8/2014 | Hasegawa | |
| 2016/0264011 A1 | 9/2016 | Yasukawa et al. | |

FOREIGN PATENT DOCUMENTS

| | | |
|---|---|---|
| EP | 2650846 A2 | 10/2013 |
| JP | 2010-230499 A | 10/2010 |
| JP | 2012-147651 A | 8/2012 |
| JP | 2013-041324 A | 2/2013 |

(Continued)

*Primary Examiner* — Gertrude Arthur Jeanglaude
(74) *Attorney, Agent, or Firm* — Volpe Koenig (57) ABSTRACT

An information processing system according to one embodiment includes: a provision unit configured to transmit to a user terminal an incentive list indicating one or more incentives provided by one or more facilities; a receiving unit configured to receive from the user terminal an incentive selected from the incentive list by a user of the user terminal; and a request unit configured to transmit a reservation request for reserving a power transmitting device of a corresponding facility which is the facility corresponding to the selected incentive for a vehicle corresponding to the user, to the corresponding facility.

12 Claims, 5 Drawing Sheets

(56) References Cited

FOREIGN PATENT DOCUMENTS

| | | |
|---|---|---|
| JP | 2013-085342 A | 5/2013 |
| JP | 2014-042383 A | 3/2014 |
| JP | 2016-051278 A | 4/2016 |
| WO | 2011/109460 A2 | 9/2011 |
| WO | 2015/053163 A1 | 4/2015 |
| WO | 2017/154760 A1 | 9/2017 |

* cited by examiner

INFORMATION PROCESSING SYSTEM

TECHNICAL FIELD

An aspect of the present disclosure relates to an information processing system that supports charging of a battery of a vehicle.

BACKGROUND ART

An information processing system is known that supports charging of a battery of a vehicle. For example, Patent Literature 1 discloses a charging facility reservation system that makes a reservation for a charging facility based on a scheduled arrival time and a charging time. Patent Literature 2 discloses a charging control system that calculates a charging time for each motor-driven vehicle and makes a reservation for a charging start instruction and/or a charging stop instruction of each motor-driven vehicle based on the calculated charging time, a predicted amount of consumed electric power, and an amount of capable electric power. Patent Literature 3 discloses a charging device that calculates a time between a charging end time of a first vehicle and a charging start time of a second vehicle which is charged after the first vehicle and sets a charging time based on the calculated time.

CITATION LIST

Patent Literature

Patent Literature 1: JP 2010-230499 A
Patent Literature 2: JP 2012-147651 A
Patent Literature 3: JP 2013-85342 A

SUMMARY OF INVENTION

Technical Problem

In a process of reserving a power transmitting device that charges a vehicle, it is preferable to consider a supply-demand relationship between a facility including the power transmitting device and the vehicle.

Solution to Problem

According to an aspect of the present disclosure, there is provided an information processing system including: a provision unit configured to transmit to a user terminal an incentive list indicating one or more incentives provided by one or more facilities; a receiving unit configured to receive from the user terminal an incentive selected from the incentive list by a user of the user terminal; and a request unit configured to transmit a reservation request for reserving a power transmitting device of a corresponding facility which is the facility corresponding to the selected incentive for a vehicle corresponding to the user, to the corresponding facility.

Effects of Invention

According to an aspect of the present disclosure, it is possible to reserve a power transmitting device in consideration of a supply-demand relationship between a facility including the power transmitting device and a vehicle.

DESCRIPTION OF EMBODIMENTS

An information processing system according to an aspect of the present disclosure includes a provision unit configured to transmit to a user terminal an incentive list indicating one or more incentives provided by one or more facilities, a receiving unit configured to receive from the user terminal an incentive selected from the incentive list by a user of the user terminal, and a request unit configured to transmit a reservation request for reserving a power transmitting device of a corresponding facility which is the facility corresponding to the selected incentive for a vehicle corresponding to the user, to the corresponding facility.

In this aspect, a power transmitting device of a facility corresponding to an incentive which is provided by the facility and selected by a user is reserved for a vehicle corresponding to the user. Through this process, it is possible to reserve a power transmitting device in consideration of a supply-demand relationship between a facility including the power transmitting device and a vehicle.

The information processing system according to another aspect may further include a determination unit configured to determine whether charging of the vehicle is necessary based on a charging history of the vehicle, and the provision unit may transmit the incentive list to the user terminal when the determination unit determines that charging is necessary. By transmitting the incentive list only when charging of the vehicle is necessary, it is possible to omit transmission of the incentive list with low necessity and processes subsequent thereto. It is possible to reduce an amount of data flowing in a communication network and a processing load of the information processing system.

In the information processing system according to another aspect, the determination unit may estimate at least one attribute of an SOC of a battery of the vehicle, a next charging timing of the vehicle, and a travel distance of the vehicle since previous charging from the charging history and may determine whether charging of the vehicle is necessary based on the estimated at least one attribute. By using at least one of the attributes, it is possible to accurately determine whether charging of the vehicle is necessary.

In the information processing system according to another aspect, the provision unit may select one or more facilities out of the plurality of facilities and may transmit to the user terminal the incentive list indicating one or more incentives provided by the selected one or more facilities. Since an amount of data of the incentive list decreases when a facility is selected, it is possible to curb an amount of data flowing in the communication network.

In the information processing system according to another aspect, the provision unit may select the one or more facilities based on a geographical positional relationship between the user or the vehicle and the plurality of facilities. By selecting a facility in consideration of the geographical positional relationship, it is possible to present a user with an incentive that the user is highly likely to select. By efficiently providing the incentive list, it is possible to reduce loads associated with hardware resources of the communication network and the information processing system.

In the information processing system according to another aspect, the provision unit may select the facility which is located within a predetermined distance from a position of the user or the vehicle. By selecting a facility in consideration of a distance between a user or a vehicle and the facility, it is possible to present a user with an incentive that the user is highly likely to select.

In the information processing system according to another aspect, the provision unit may select the facility which is located within a predetermined distance from a past moving route of the vehicle. By selecting a facility in consideration of a positional relationship between a route of a vehicle and the facility, it is possible to present a user with an incentive that the user is highly likely to select.

In the information processing system according to another aspect, the provision unit may select the facility which is located in a reachable range of the vehicle. By selecting a facility which is reachable by a vehicle, it is possible to present a user with an incentive that the user is highly likely to select.

In the information processing system according to another aspect, the provision unit may select the facility corresponding to a user attribute of the user. By selecting a facility corresponding to a user attribute, it is possible to present a user with an incentive that the user is highly likely to select.

In the information processing system according to another aspect, the provision unit may transmit the incentive list to the user terminal such that the user terminal outputs the incentive list without inquiring of the user about whether charging of the vehicle is necessary. In this case, the user is aware of an incentive without being aware of charging. Accordingly, the user is aware only of an incentive and moves to the facility, and charging of the vehicle is performed while the user pays no particular attention to charging in the facility. Accordingly, it is possible to release the user from a sense of obligation or a stress that charging must be performed.

Hereinafter, an embodiment of the present disclosure will be described in detail with reference to the accompanying drawings. In description of the drawings, the same or corresponding elements will be referred to by the same reference signs and description thereof will not be repeated.

Outline of System

An information processing system 1 according to an embodiment is a computer system that supports charging of a battery of a vehicle. The information processing system 1 provides a user with an incentive list indicating one or more incentives which are provided from one or more facilities including a power transmitting device. When the user selects a specific incentive out of the incentive list, the information processing system 1 requests the facility corresponding to the selected incentive (referred to as a "corresponding facility") to reserve the power transmitting device of the corresponding facility for a vehicle corresponding to the user. The corresponding facility reserves the power transmitting device for the user in response to the request for reservation. Thereafter, the user or a person with a certain relationship with the user can move the vehicle to the facility (the facility corresponding to the selected incentive, that is, the corresponding facility) and charge the vehicle with the power transmitting device of the facility.

A "vehicle" is an instrument that transports a person or an object from a certain place to another place. A vehicle includes a chargeable battery (hereinafter, simply referred to as a "battery") as at least a part of a power source. In this embodiment, an electric vehicle is exemplified as the vehicle, but the type of the vehicle is not particularly limited. For example, the vehicle may be another type of automobile or may be a motorbike, a bicycle, a train, an overwater vehicle, an underwater vehicle, or an airplane. Accordingly, a route on which the vehicle travels may be an overland route, a waterway, or an aerial route.

A "user" is a person who selects an incentive and is directly or indirectly associated with movement of a vehicle to a facility corresponding to the selected incentive. The user may be a driver or an operator of a vehicle, may be an occupant of a vehicle, or may be a person who is not in a vehicle. For example, when the user is a driver or an operator of a vehicle, the user may be a person who is directly associated with movement of the vehicle to a facility. When the user is an occupant of a vehicle, the user may be a person who is directly or indirectly associated with movement of the vehicle to a facility. When the user is a person who is not in a vehicle, the user may be a person who is indirectly associated with movement of the vehicle to a facility.

A "vehicle corresponding to a user" is a vehicle which is directly or indirectly associated with a user who has selected an incentive. The type of this relationship is not particularly limited and, for example, a "vehicle corresponding to a user" may be a vehicle which is owned or rented by the user or may be a vehicle which is owned or rented by a person with a certain relationship with the user. The type of the person with a certain relationship with the user is not limited and, for example, may be a family member, a friend, or an acquaintance.

A "facility" is a structure including a power transmitting device that can charge a battery of a vehicle. The type, scale, and owner of the facility are not particularly limited. For example, the type of the facility having a power transmitting device is not limited in the same way that the type of the vehicle is not limited. For example, the facility may be an arbitrary commercial facility, an arbitrary public facility, or an arbitrary private facility. More specific examples of the facility include a charging station, a shopping mall, a restaurant, a cafeteria, a parking lot, a stadium, a hospital, a city hall, a park, an apartment, a solitary house, a harbor, and an airport. However, the facility is not limited to such examples. The type of a power transmitting device provided in the facility is likewise not limited and, for example, may be a wireless power transmitting device or a wired (a cable type or a receptacle type) power transmitting device.

An "incentive" is a special service which is offered to a user by a facility. The type and details of the incentive are not particularly limited. For example, the incentive may be provision of a tangible thing or an intangible thing to a user. Specific examples of the incentive include provision of a souvenir (a novelty item), a commodity, or a service, discount in purchasing products, provision of a free ticket, and provision of points having a monetary value. The incentive is not limited to such examples. Each facility may provide a single incentive or may provide a plurality of incentives.

Two or more facilities may provide the same incentive. An "incentive list" is information indicating a list including one or more incentives, that is, information indicating choices of incentives.

A "reservation of a power transmitting device" refers to a process of making the power transmitting device available in a specific time period for a user such that the user can charge a battery of a vehicle. With this reservation, the user can use the power transmitting device in the specific time period.

Figure 1:
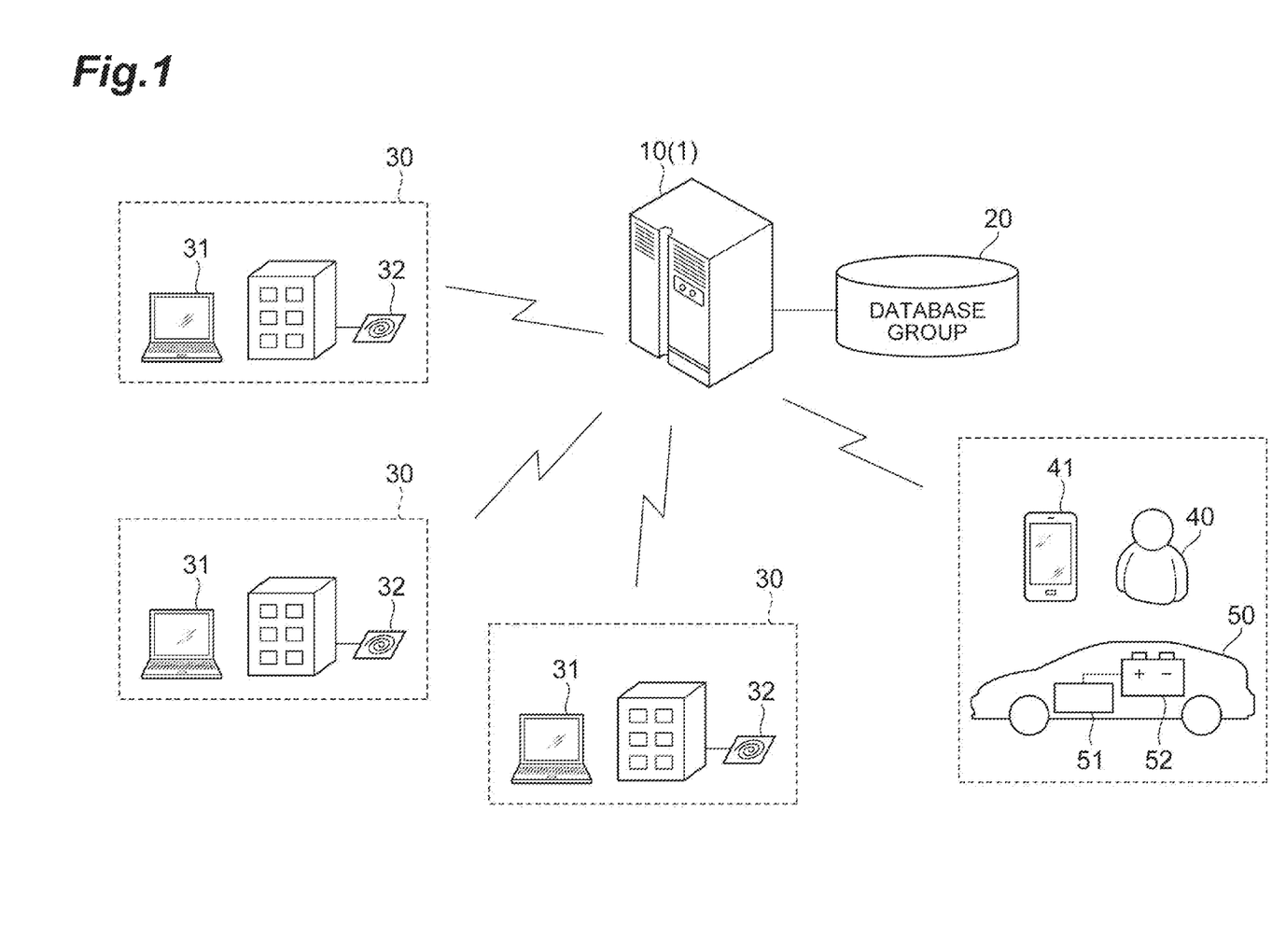
FIG. 1 is a diagram illustrating an application example of an information processing system according to an embodiment.

FIG. 1 is a diagram schematically illustrating an application example of the information processing system 1. FIG. 1 illustrates a plurality of facilities 30 and a single user 40, but the number of facilities 30 and the number of users 40 using the information processing system 1 are not particularly limited. The information processing system 1 mediates between one or more facilities 30 that offer incentives and a user 40 who selects an incentive. The information processing system 1 includes a server 10 that performs a main function for mediation. The server 10 refers to a database group 20 that stores data required for performing the function according to necessity. The server 10 can perform data communication with a facility terminal 31 which is a terminal of each facility 30 and a user terminal 41 of each user 40. The server 10 is connected to the database group 20, the facility terminals 31, and the user terminals 41 via a communication network. The configuration of the communication network is not particularly limited and the communication network may be constructed, for example, using arbitrary communication networks such as the Internet and an intranet.

Each facility 30 includes at least one power transmitting device 32. A vehicle 50 corresponding to a user 40 can be charged using the power transmitting device 32. A vehicle 50 includes a power receiving device 51 and a battery 52. Electricity provided from the power transmitting device 32 is received by the power receiving device 51 and stored as energy in the battery 52, whereby the battery 52 is charged.

A user 40 can ascertain an incentive list using the user terminal 41 and select a desired incentive from the incentive list. The type of a computer which is used as the user terminal 41 is not particularly limited and the user terminal 41 may or may not be mounted in a vehicle 50. For example, the user terminal 41 may be a car navigation system or a mobile terminal such as a high-functional mobile phone (a smartphone), a mobile phone, a personal digital assistant (PDA), a tablet, or a lap-top PC. When the user terminal 41 is not mounted in a vehicle 50, the user terminal 41 may or may not be able to be connected to a system in the vehicle 50.

Configuration of System

Figure 2:
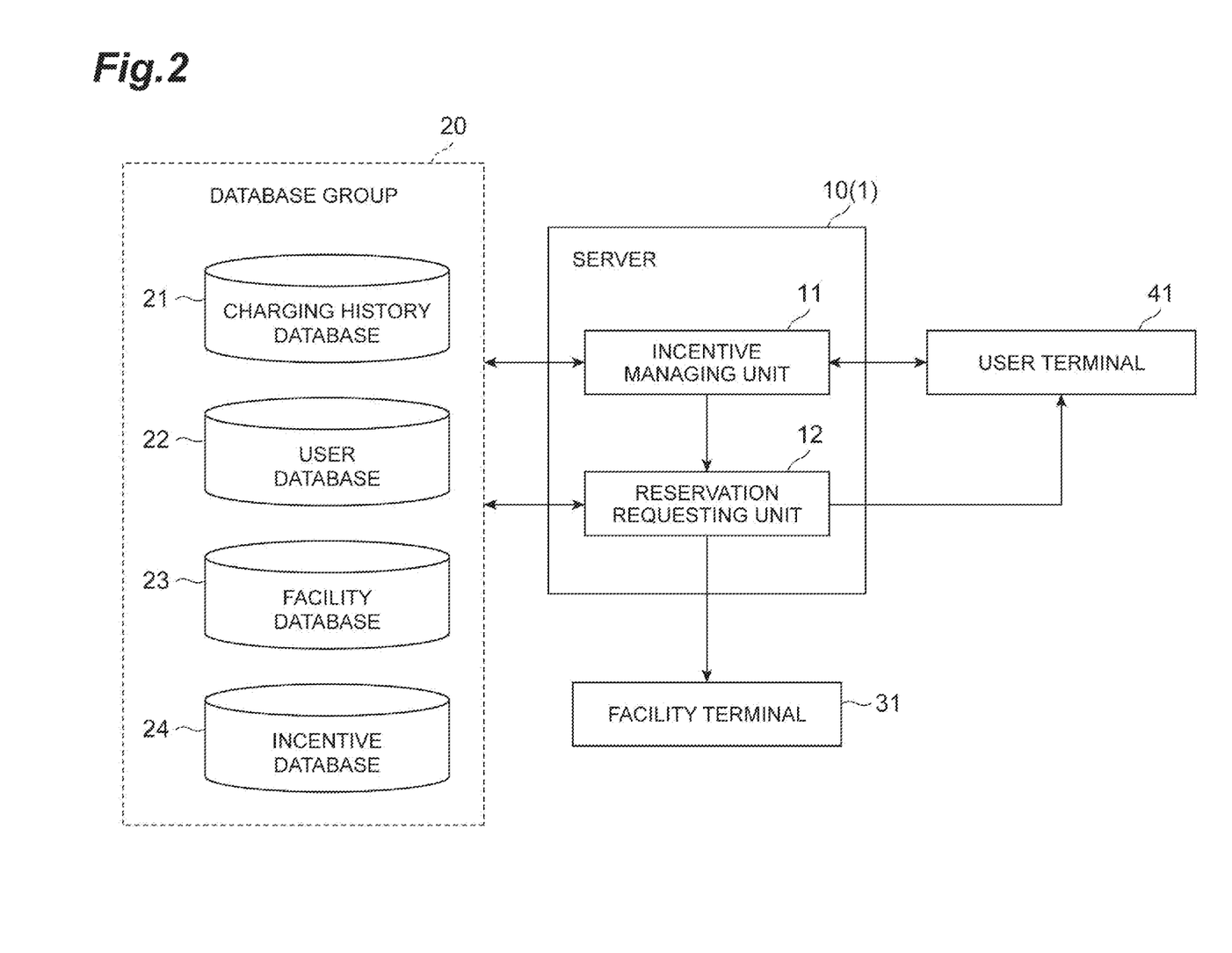
FIG. 2 is a diagram illustrating an example of a configuration of the information processing system according to the embodiment.

FIG. 2 is a diagram illustrating an example of a configuration of the information processing system 1. The information processing system 1 (the server 10) includes an incentive managing unit 11 and a reservation requesting unit 12 as functional elements. The incentive managing unit 11 is a functional element that transmits an incentive list to a user terminal 41 and receives an incentive selected from the incentive list by a user. The reservation requesting unit 12 is a function element that transmits a reservation request for reserving the power transmitting device to a facility corresponding to the selected incentive. The incentive managing unit 11 serves as a determination unit, a provision unit, and a receiving unit, and the reservation requesting unit 12 serves as a request unit. The incentive managing unit 11 and the reservation requesting unit 12 access the database group 20 and read or write data according to necessity.

Figure 3:
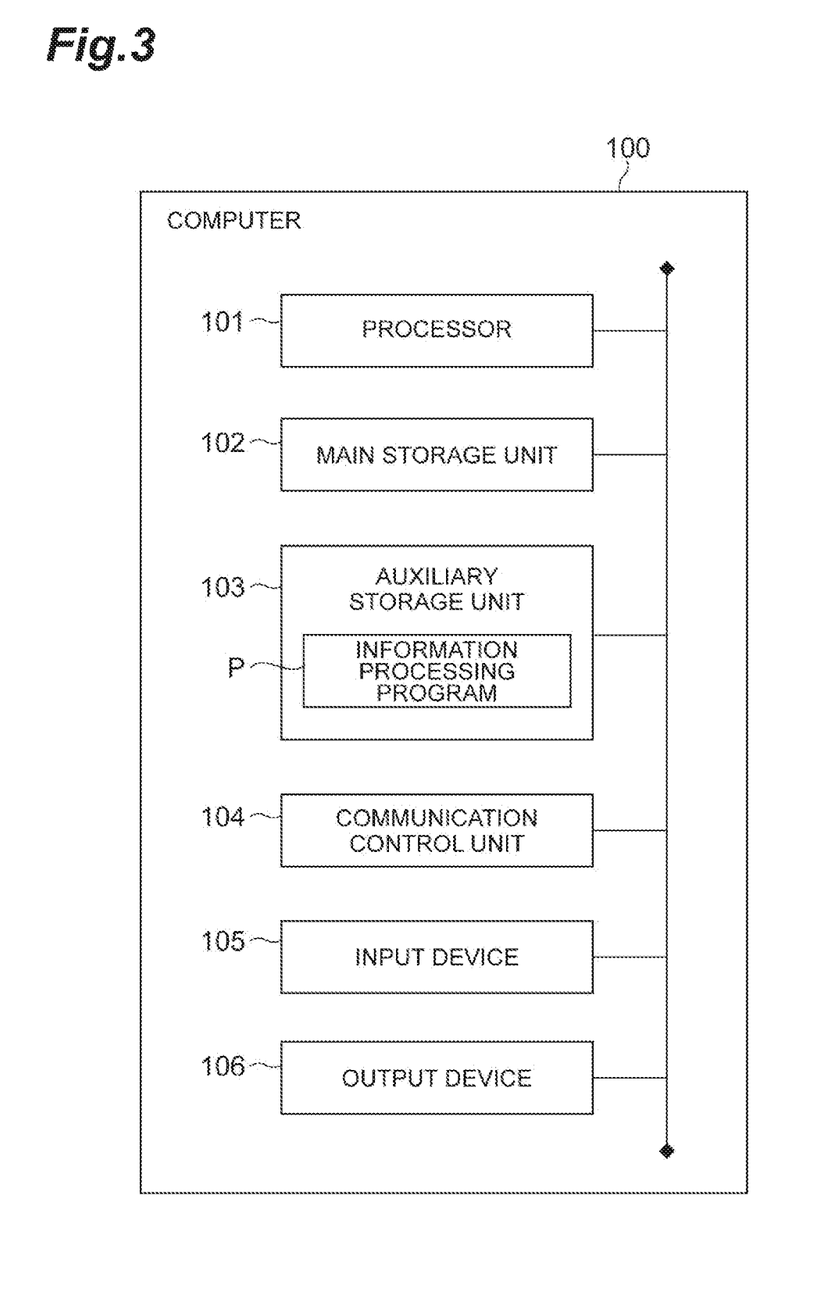
FIG. 3 is a diagram illustrating a general hardware configuration of a computer which is used for the information processing system according to the embodiment.

FIG. 3 is a diagram illustrating a general hardware configuration of a computer 100 which constitutes the information processing system 1 (the server 10). For example, the computer 100 includes a processor 101, a main storage unit 102, an auxiliary storage unit 103, a communication control unit 104, an input device 105, and an output device 106. The processor 101 executes an operating system and an application program. The main storage unit 102 includes, for example, a ROM and a RAM. The auxiliary storage unit 103 includes, for example, a hard disk or a flash memory and generally stores a larger amount of data than the main storage unit 102 does. The auxiliary storage unit 103 stores an information processing program P for causing at least one computer to serve as the information processing system 1 (the server 10). The communication control unit 104 includes, for example, a network card or a radio communication module. The input device 105 includes, for example, a keyboard, a mouse, and a touch panel. The output device 106 includes, for example, a monitor and a speaker.

The functional elements of the information processing system 1 (the server 10) are realized by reading the information processing program P onto the processor 101 or the main storage unit 102 and executing the information processing program P. The information processing program P includes codes for realizing the incentive managing unit 11 and the reservation requesting unit 12. The processor 101 causes the communication control unit 104, the input device 105, or the output device 106 to operate in accordance with the information processing program P and performs reading and writing of data in the main storage unit 102 or the auxiliary storage unit 103. By this process, the functional elements of the information processing system 1 (the server 10) are realized. Data or a database which is required for the processes may be stored in the main storage unit 102 or the auxiliary storage unit 103.

The information processing program P may be provided in a state in which it is fixedly recorded on a tangible recording medium such as a CD-ROM, a DVD-ROM, or a semiconductor memory. Alternatively, the information processing program P may be provided as a data signal which is superimposed on carrier waves via the communication network. The provided information processing program P is stored in the auxiliary storage unit 103.

The information processing system 1 (the server 10) may be constituted by a single computer or may be constituted by a plurality of computers. When a plurality of computers are used, the computers are connected to each other via a communication network such as the Internet or an intranet, whereby the information processing system 1 (for example, a logically single server 10) is constructed.

The database group 20 is a group of one or more databases that store data required for the processes of the information processing system 1. A database is a functional element (a storage unit) that stores a data set to cope with an arbitrary data operation (for example, extraction, addition, deletion, or overwriting) from a processor or an external computer. The method of mounting a database is not limited and the database may be, for example, a relational database. A management entity and an installation place of the database group 20 are not particularly limited. For example, the database group 20 may be managed by a computer system other than the information processing system 1 or may be a part of the information processing system 1. The management entities of the individual databases may be different from each other or may be the same. In this embodiment, the database group 20 includes a charging history database 21, a user database 22, a facility database 23, and an incentive database 24.

The charging history database 21 is a device that stores a charging history. A charging history is information indicating one or more times of charging of a battery 52 of a vehicle 50 in the past. The configuration of a charging history is not particularly limited. For example, each record of charging history may include at least one of a vehicle ID and a user ID and at least one of an amount of charge, a state of charge (SOC) of a battery 52, a charging place, and a charging date and time. The vehicle ID is an identifier for uniquely identifying a vehicle 50. The method of setting the vehicle ID is not particularly limited. For example, the vehicle ID may be unique information such as a vehicle number or may be replaced with an identifier of the power receiving device 51 or the battery 52 which is mounted in the corresponding vehicle 50. The user ID is an identifier for uniquely identifying a user 40. The user ID is set, for example, when a user 40 registers himself or herself to use the information processing system 1.

Data items (a vehicle ID, a user ID, an amount of charge, an SOC, a charging place, and a charging date and time) required for generating the charging history may be provided from the power transmitting device 32, the power receiving device 51, or the user terminal 41. The charging date and time may be expressed by a time at which a vehicle 50 enters or exits a facility 30 or a power transmitting device 32. The information processing system 1 (the server 10) may generate records of a charging history based on data received from the power transmitting device 32, the power receiving device 51, or the user terminal 41 and store the generated records in the charging history database 21. Alternatively, a computer system other than the information processing system 1 may generate and store a charging history.

The user database 22 is a device that stores user information. The user information is information on each user 40. The configuration of the user information is not particularly limited. For example, each record of the user information may include a user ID and user attributes. The user attributes are information indicating nature or features of a user 40. Data items constituting the user attributes are not particularly limited. For example, the user attributes may include at least one of a name, a sex, an address, a phone number, an email address, a hobby, a preference, and an incentive received from a facility 30 in the past (a user history of incentives). The user attributes may include information on a vehicle 50 (for example, a vehicle ID).

The user information is generated, for example, when a user 40 has registered himself or herself to use the information processing system 1, and is stored in the user database 22. Generation and storage of user information may be performed by the information processing system 1 (the server 10) or may be performed by a computer system other than the information processing system 1.

The facility database 23 is a device that stores facility information. The facility information is information on each facility 30. The configuration of the facility information is not particularly limited. For example, each record of the facility information may include a facility ID and facility attributes and additionally include information on one or more power transmitting devices 32 provided in the facility. The facility ID is an identifier for uniquely identifying the facility 30. The facility attributes are information indicating nature or features of the facility 30. Data items constituting the facility attributes are not particularly limited. For example, the facility attributes may include at least one of a name, an address, a phone number, an email address, a category (a facility type such as "shopping mall" or "cafeteria"), and hours of operation. Data items constituting the information on the power transmitting device 32 may include, for example, at least one of a model number, a serial number, and specifications (performance) of the power transmitting device 32. Generation and storage of the facility information may be performed by the information processing system 1 (the server 10) or may be performed by a computer system other than the information processing system 1.

The incentive database 24 is a device that stores incentive information. The incentive information is information indicating an incentive which is provided from the facility 30 and is available. The configuration of the incentive information is not particularly limited. For example, each record of the incentive information may include an incentive ID, a facility ID, and incentive attributes. The incentive ID is an identifier for identifying an incentive. One incentive may be uniquely identified by the incentive ID or may be uniquely identified by a combination of the incentive ID and the facility ID. Incentive attributes are expressed by a group of one or more data items indicating details of an incentive. For example, incentive attributes may indicate users to whom the incentive can be applied (that is, candidates for the incentive) or a discount rate. Alternatively, the incentive attributes may indicate a souvenir, a commodity, a service, or points to be provided. Generation and storage of the incentive information may be performed by the information processing system 1 (the server 10) or may be performed by a computer system other than the information processing system 1.

The configurations of the databases in the database group 20 and the records thereof are not limited to the above description and arbitrary normalization or redundancy may be performed on the databases. For example, the incentive information may be incorporated into the facility information.

Operation of System

Figure 4:
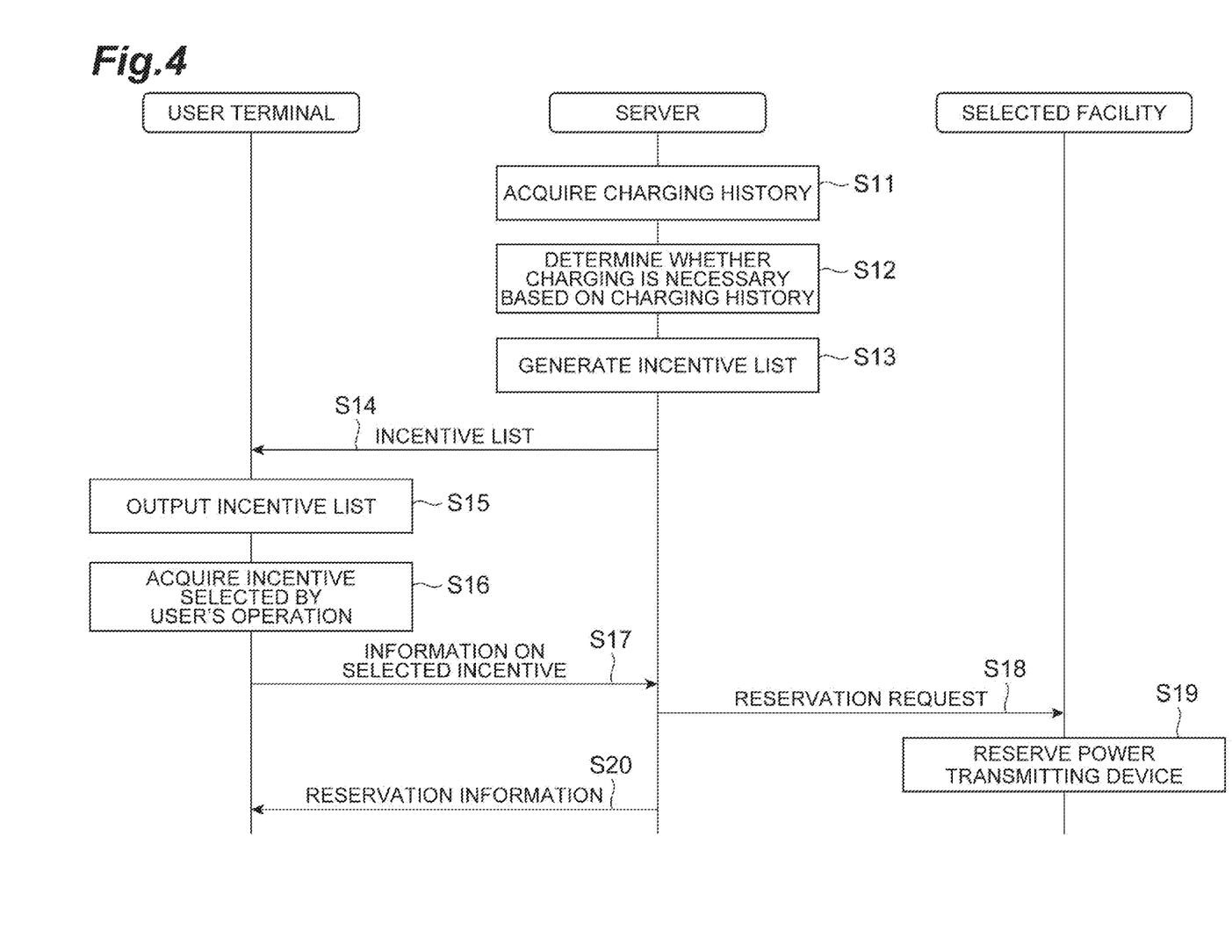
FIG. 4 is a sequence diagram illustrating an example of a process flow which is performed by the information processing system according to the embodiment.

The operation of the information processing system 1 will be described below and an information processing method according to this embodiment will also be described below. FIG. 4 is a sequence diagram illustrating an example of the operation of the information processing system 1. In description with reference to FIG. 4, only a user terminal 41 of one user 40 and a facility 30 corresponding to an incentive selected by the user 40 will be described for the purpose of concise explanations.

In Step S11, the incentive managing unit 11 acquires a charging history corresponding to a user 40 from the charging history database 21. For example, the incentive managing unit 11 may read a charging history corresponding to a user ID indicating the user 40 or may read a charging history corresponding to a vehicle ID corresponding to the user 40.

In Step S12, the incentive managing unit 11 determines whether charging of a battery 52 of a vehicle 50 corresponding to the user 40 is necessary based on the charging history (a determination step). For example, the incentive managing unit 11 may estimate an SOC of the battery 52 of the vehicle 50 based on the charging history, determine that charging is necessary when the SOC is less than a threshold Ta, and determine that charging is not necessary when the SOC is equal to or greater than the threshold Ta. Alternatively, the incentive managing unit 11 may estimate a next charging timing based on the charging history, determine that charging is necessary when an interval between a current time point and the next charging timing is less than a threshold Tb, and determine that charging is not necessary when the interval is equal to or greater than the threshold Tb. The "next charging timing" is not a preset timing (for example, a timing which is scheduled in advance by the user 40 using a calendar function), but a timing which is dynamically set by estimation based on the charging history by the incentive managing unit 11. The next charging timing may be expressed by a date and time or may be expressed by a date. Alternatively, the incentive managing unit 11 may estimate a travel distance of the vehicle 50 after the previous charging based on the charging history, determine that charging is necessary when the travel distance is equal to or greater than a threshold Tc, and determine that charging is not necessary when the travel distance is less than the threshold Tc. The SOC, the next charging timing, and the travel distance are examples of attributes for determining whether charging is necessary or not.

Alternatively, the incentive managing unit 11 may determine whether charging is necessary using two or more attributes which are arbitrarily selected from the SOC, the next charging timing, and the travel distance. For example, when the interval between the current time point and the next charging timing is equal to or greater than the threshold Tb and the SOC is less than a threshold Td (Td<Ta), the incentive managing unit 11 may determine that charging is necessary. As in this example, it is possible to decrease a probability that the battery 52 will be exhausted by the next charging timing (that is, a probability that the battery 52 will not be able to supply electric power) in consideration of both the next charging timing and the SOC.

When it is determined that charging is necessary, the process flow progresses to Step S13. On the other hand, when it is determined that charging is not necessary, the process of Step S13 is not performed and the process flow for the user 40 ends.

In Step S13, the incentive managing unit 11 generates an incentive list. The incentive managing unit 11 generates the incentive list with reference to the facility database 23 and the incentive database 24 and with reference to the charging history database 21 or the user database 22 according to necessity. The incentive managing unit 11 may determine one or more incentives which are included in the incentive list using an arbitrary method.

For example, the incentive managing unit 11 may select one or more facilities 30 based on a geographical positional relationship between the user 40 or the vehicle 50 and a plurality of facilities 30 and extract incentives of the selected facility 30 (a first method). The "geographical positional relationship" is, for example, a positional relationship based on a physical distance. The selection method based on the geographical positional relationship is not particularly limited.

In an example using the geographical positional relationship, the incentive managing unit 11 may select one or more facilities 30 which are located within a predetermined distance Ra from a reference position. This process means that an incentive of a facility 30 relatively close to the reference position is extracted. The method of setting the reference position is not particularly limited, and may be a position (for example, a current position or address) of the user 40 or a position (for example, a current position) of the vehicle 50. The incentive managing unit 11 may receive position information indicating the current position of the user terminal 41 from the user terminal 41 and recognize the position as the current position of the user 40 or the vehicle 50. Alternatively, the incentive managing unit 11 may receive position information indicating the current position of the vehicle 50 from the vehicle 50 and recognize the position as the current position of the vehicle 50. The user terminal 41 or the vehicle 50 can acquire its own current position using a positioning function such as a global positioning system (GPS). The address of the user 40 can be acquired from the user database 22.

In another example using the geographical positional relationship, the incentive managing unit 11 may identify or estimate a past moving route of the vehicle 50 and select one or more facilities 30 which are located within a predetermined distance Rb from the route. This process is for extracting an incentive of a facility 30 close to a place through which the user 40 and the vehicle 50 are likely to pass. For example, the incentive managing unit 11 may receive information indicating the past moving route of the vehicle 50 from the user terminal 41 or may estimate the moving route based on the charging history.

In another example using the geographical positional relationship, the incentive managing unit 11 may estimate a reachable range of the vehicle 50 and select one or more facilities 30 which are located in the range. For example, the incentive managing unit 11 may estimate the reachable range using at least one of the charging history acquired from the charging history database 21 and information indicating the past moving route of the vehicle 50. The reachable range refers to a range in which the vehicle 50 can travel without charging the vehicle.

Alternatively, the incentive managing unit 11 may select one or more facilities 30 corresponding to a user attribute (for example, a hobby or a preference) of the user 40 with reference to the user database 22, the facility database 23, and the incentive database 24 and extract an incentive of the facility 30 (a second method). A "facility corresponding to a user attribute" refers to a facility having a facility attribute which match the user attributes or which is included in the user attributes. For example, the incentive managing unit 11 may select a facility 30 which belongs to a category corresponding to the user attribute. Alternatively, the incentive managing unit 11 may select a facility 30 which provides an incentive matching the user attribute.

Alternatively, the incentive managing unit 11 may extract an incentive by combination of the first and second methods (a third method). This means that an incentive of a facility 30 which is selected by combination of two or more arbitrary methods is extracted. For example, the incentive managing unit 11 may select one or more facilities which are located within distance Ra from a reference position and which corresponds to the user attribute. Alternatively, the incentive managing unit 11 may select one or more facilities 30 which are located within distance Rb from a past moving route of the vehicle 50 and which correspond to the user attribute. Alternatively, the incentive managing unit 11 may select one or more facilities 30 which are located in a reachable range of the vehicle 50 and which correspond to the user attribute.

Alternatively, the incentive managing unit 11 may extract all incentives which are acquired from the facility database 23 and the incentive database 24 (a fourth method).

Alternatively, the incentive managing unit 11 may extract an incentive of a facility 30 which is selected using any one of the first to fourth methods and which has offered provision of an incentive (a fifth method). Specifically, the incentive managing unit 11 transmits information on the user 40 (user information) to the selected one or more facility terminals 31 and receives offer information indicating the offer from at least a part of the one or more facility terminals 31. The offer information can be said as a response to the user information. The incentive managing unit 11 extracts an incentive of the facility 30 having transmitted the offer information.

The method of extracting an incentive is not limited to the first to fifth methods. In any way, the incentive managing unit 11 generates an incentive list indicating the extracted one or more incentives. The incentive list does not include an inquiry about whether the user 40 wants to charge the battery 52.

In Step S14, the incentive managing unit 11 transmits the generated incentive list to the user terminal 41 (a provision step). The user terminal 41 receives the incentive list. The incentive managing unit 11 may transmit the incentive list to the user terminal 41 such that the user terminal 41 outputs the incentive list without inquiring of the user 40 about whether charging of the battery 52 is desired. For example, the incentive managing unit 11 may transmit to the user terminal 41 a control signal (a non-display signal) for prohibiting the user terminal 41 from inquiring of the user 40 about whether charging of the battery 52 is desired.

In Step S15, the user terminal 41 outputs the incentive list. The method of outputting the incentive list is not particularly limited. For example, the user terminal 41 may display the incentive list on a monitor or may output the incentive list by voice. The user terminal 41 may output the incentive list without outputting an inquiry about whether charging of the battery 52 is desired. For example, the user terminal 41 may output the incentive list without outputting the inquiry in response to receiving the non-display signal transmitted from the incentive managing unit 11. In an example in which the incentive list is output without outputting the inquiry, the user terminal 41 may output only the incentive list.

Figure 5:
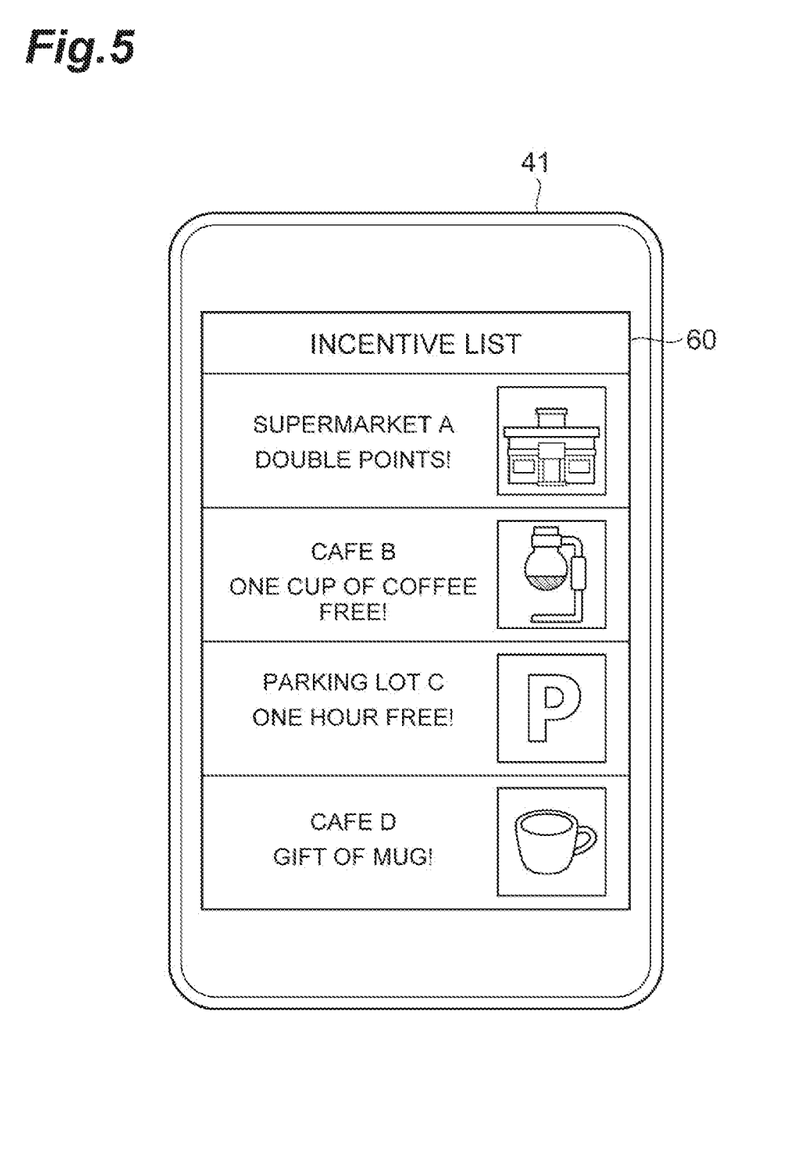
FIG. 5 is a diagram illustrating an example of an incentive list.

FIG. 5 is a diagram illustrating an example of an incentive list displayed on a user terminal 41. In this example, the user terminal 41 displays four incentives included in an incentive list 60. The incentives include "double points" provided from Supermarket A, "one cup of coffee free" provided from Cafe B, "one hour free" provided from Parking lot C, and "gift of mug" provided from Cafe D.

The method of displaying an incentive list is not particularly limited. For example, the incentive list may be displayed as banner advertisement.

In Step S16, the user terminal 41 acquires one incentive selected by a user's operation. For example, when the user selects the incentive of Cafe B on the screen illustrated in FIG. 5, the user terminal 41 acquires the selected incentive.

In Step S17, the user terminal 41 transmits information of the selected incentive (desired incentive information) to the server 10. For example, when the user selects the incentive of Cafe B on the screen illustrated in FIG. 5, the user terminal 41 transmits desired incentive information indicating Cafe B and the incentive "one cup of coffee free." In the server 10, the incentive managing unit 11 receives the desired incentive information (a receiving step).

In Step S18, the reservation requesting unit 12 transmits a reservation request to the facility 30 indicated by the desired incentive information (a request step). The reservation request is information for reserving the power transmitting device 32 of the facility 30 corresponding to the incentive indicated by the desired incentive information (that is, the incentive selected by the user 40) for the vehicle 50 corresponding to the user 40. For example, the reservation requesting unit 12 generates a reservation request including information on at least one of the user 40 and the vehicle 50 (for example, a name of the user 40, a vehicle ID, etc.) with reference to the user database 22. Then, the reservation requesting unit 12 transmits the reservation request to the facility terminal 31 of the facility (corresponding facility) 30 corresponding to the selected incentive. "To transmit a reservation request to a facility (a corresponding facility)" means that the reservation request is transmitted such that the facility (corresponding facility) 30 is aware of the reservation request. So long as this process can be realized, the reservation requesting unit 12 may transmit the reservation request to a computer other than the facility terminal 31.

In Step S19, the facility 30 having received the reservation request reserves the power transmitting device 32 for the vehicle 50 corresponding to the user 40. For example, the facility 30 reserves the power transmitting device 32 by correlating the user 40 or the vehicle 50, the power transmitting device 32, and a reservation date and time with each other. A specific method of the reservation process is not particularly limited and the reservation process may be automated, for example, by a computer system of the facility 30 or at least a part of the reservation process may be manually performed.

In Step S20, the reservation requesting unit 12 transmits to the user terminal 41 reservation information indicating the reservation of the power transmitting device 32 of the facility 30. For example, the reservation information may include the reservation date and time of the power transmitting device 32 of the facility 30 corresponding to the selected incentive. The reservation requesting unit 12 may receive a notification from the facility 30 in which the power transmitting device 32 has been reserved, generate reservation information based on the notification, and transmit the generated reservation information. Alternatively, the reservation requesting unit 12 may generate and transmit the reservation information at the same time as the process of Step S18 or after the process. In any way, the user 40 can understand when the battery 52 of the vehicle 50 can be charged in the facility 30 which provides the incentive, by ascertaining the reservation information using the user terminal 41.

After Step S20, the user 40 can move to the facility (corresponding facility) 30 corresponding to the selected incentive and enjoy the incentive and charging of the battery 52, based on the reservation information. The fact that the user 40 has used the incentive may be input from the facility terminal 31 or the user terminal 41 and stored in the user database 22 as a use history of the incentive. A record of charging which has been performed may be stored in the charging history database 21 as a new charging history.

The information processing system 1 (the server 10) may simultaneously perform the series of processes illustrated in FIG. 4 on a plurality of users 40 or may perform the series of processes on one user 40 a plurality of times. The information processing system 1 (the server 10) may start the series of processes at an arbitrary time and, for example, may periodically perform the series of processes or may perform the series of processes in response to receiving a processing request from the user terminal 41 or the facility terminal 31.

Advantages

As described above, an information processing system according to an aspect of the present disclosure includes: a provision unit configured to transmit to a user terminal an incentive list indicating one or more incentives provided by one or more facilities; a receiving unit configured to receive from the user terminal an incentive selected from the incentive list by a user of the user terminal; and a request unit configured to transmit a reservation request for reserving a power transmitting device of a corresponding facility which is the facility corresponding to the selected incentive for a vehicle corresponding to the user, to the corresponding facility.

An information processing method according to an aspect of the present disclosure is an information processing method performed by an information processing system including at least one processor, and the information processing method includes: a provision step configured to transmit to a user terminal an incentive list indicating one or more incentives provided by one or more facilities; a receiving step configured to receive from the user terminal an incentive selected from the incentive list by a user of the user terminal; and a request step configured to transmit a reservation request for reserving a power transmitting device of a corresponding facility which is the facility corresponding to the selected incentive for a vehicle corresponding to the user, to the corresponding facility.

An information processing program according to an aspect of the present disclosure causes a computer system to perform: a provision step that transmits to a user terminal an incentive list indicating one or more incentives provided by one or more facilities; a receiving step that receives from the user terminal an incentive selected from the incentive list by a user of the user terminal; and a request step that transmits a reservation request for reserving a power transmitting device of a corresponding facility which is the facility corresponding to the selected incentive for a vehicle corresponding to the user, to the corresponding facility.

A computer-readable recording medium according to an aspect of the present disclosure stores an information processing program causing a computer system to perform: a provision step that transmits to a user terminal an incentive list indicating one or more incentives provided by one or more facilities; a receiving step that receives from the user terminal an incentive selected from the incentive list by a user of the user terminal; and a request step that transmits a reservation request for reserving a power transmitting device of a corresponding facility which is the facility corresponding to the selected incentive for a vehicle corresponding to the user, to the corresponding facility.

In these aspects, a power transmitting device of a facility corresponding to an incentive which is provided by the facility and selected by a user is reserved for a vehicle corresponding to the user. Through this process, facility-side supply that a user is wanted to use the facility and user-side demand that a user wants to use the facility are considered by provision of an incentive from the facility and selection of an incentive by the user. As a result, it is possible to match a power transmitting device (a supply side) that can supply electric power for charging a battery of a vehicle and a vehicle (a demand side) that can receive the supplied electric power. Since a power transmitting device is reserved by provision and selection of an incentive, it is possible to reserve a power transmitting device in consideration of a supply-demand relationship between a facility including the power transmitting device and a vehicle.

In the aspect, a user reserves a power transmitting device without searching for the power transmitting device alone. In other words, a reservation for the power transmitting device is performed without transmitting a data signal for searching for and reserving the power transmitting device from the user terminal to the information processing system. Accordingly, it is possible to prevent an increase in an amount of information flowing in a communication network due to the data signal and to reduce a load of hardware resources (for example, a processor and a memory) of the user terminal which are required for searching for and reserving the power transmitting device.

In the aspect, a power transmitting device is reserved by matching incentives provided from facilities with a user's preference. This can be realized by a mechanism that puts an incentive under the hammer and allows a vehicle to be charged in a facility which provides an incentive desired by a user. With this mechanism, it is possible to perform a reservation for charging without allowing a user to be particularly aware of charging of a battery of a vehicle. A user can obtain an effect of charging a vehicle in a facility while the user is enjoying a selected incentive in the facility.

The information processing system according to another aspect may further include a determination unit that determines whether charging of the vehicle is necessary based on a charging history of the vehicle, and the provision unit may transmit the incentive list to the user terminal when the determination unit determines that charging is necessary. By transmitting the incentive list only when charging of the vehicle is necessary, it is possible to omit transmission of the incentive list with low necessity and processes subsequent thereto. It is possible to reduce an amount of data flowing in a communication network and a processing load of the information processing system.

In the information processing system according to another aspect, the determination unit may estimate at least one attribute of an SOC of a battery of the vehicle, a next charging timing of the vehicle, and a travel distance of the vehicle from previous charging from the charging history and may determine whether charging of the vehicle is necessary based on the estimated at least one attribute. By using at least a part of the attributes, it is possible to accurately determine whether charging of the vehicle is necessary.

In the information processing system according to another aspect, the provision unit may select one or more facilities out of the plurality of facilities and may transmit to the user terminal the incentive list indicating one or more incentives provided by the selected one or more facilities. Since an amount of data of the incentive list decreases by selecting a facility, it is possible to curb an amount of data flowing in the communication network.

In the information processing system according to another aspect, the provision unit may select the one or more facilities based on a geographical positional relationship between the user or the vehicle and the plurality of facilities. By selecting a facility in consideration of the geographical positional relationship, it is possible to present a user with an incentive that the user is highly likely to select. By efficiently providing the incentive list, it is possible to reduce loads associated with hardware resources of the communication network and the information processing system.

In the information processing system according to another aspect, the provision unit may select the facility which is located within a predetermined distance from a position of the user or the vehicle. By selecting a facility in consideration of a distance between a user or a vehicle and the facility, it is possible to present a user with an incentive that the user is highly likely to select.

In the information processing system according to another aspect, the provision unit may select the facility which is located within a predetermined distance from a past moving route of the vehicle. By selecting a facility in consideration of a positional relationship between a route of a vehicle and the facility, it is possible to present a user with an incentive that the user is highly likely to select.

In the information processing system according to another aspect, the provision unit may select the facility which is located in a reachable range of the vehicle. By selecting a facility which is reachable by a vehicle, it is possible to present a user with an incentive that the user is highly likely to select.

In the information processing system according to another aspect, the provision unit may select the facility corresponding to a user attribute of the user. By selecting a facility corresponding to a user attribute, it is possible to present a user with an incentive that the user is highly likely to select.

In the information processing system according to another aspect, the provision unit may transmit the incentive list to the user terminal such that the user terminal outputs the incentive list without inquiring of the user about whether charging of the vehicle is necessary. In this case, the user is aware of an incentive without being aware of charging. Accordingly, the user is aware of only an incentive and moves to the facility, and charging of the vehicle is performed while the user does not particularly pay attention to charging in the facility. Accordingly, it is possible to allow the user to release from a sense of obligation or a stress that charging must be performed.

Modified Example

The present disclosure has been described above in detail in conjunction with an embodiment thereof. However, the present disclosure is not limited to the embodiment. The present disclosure can be modified in various forms without departing from the gist thereof.

The types of the databases used for the information processing system are not limited to the embodiment above. For example, at least one of the charging history database 21, the user database 22, the facility database 23, and the incentive database 24 may be omitted or another database may be used.

The process flow of the information processing method performed by at least one processor is not limited to the examples of the above-mentioned embodiment. For example, some of the above-mentioned steps (processes) may be omitted or the steps may be performed in different order. Two or more steps of the above-mentioned steps may be combined or some steps may be corrected or deleted. Alternatively, another step may be performed in addition to the above-mentioned steps. For example, the processes of Steps S11 and S12 may be omitted, and thus the information processing system may generate an incentive list without determining whether charging is necessary and transmit the generated incentive list to a user terminal. That is, the determination unit is not a necessary element. The process of Step S20 may be omitted and thus the transmission of reservation information is not necessary.

When the information processing system compares two numerical values with each other, any of two criteria of "equal to or greater than" and "greater than" may be used and any of two criteria of "equal to or less than" and "less than" may be used. Selection of this criterion does not change technical sense of the process of comparing two numerical values with each other.

INDUSTRIAL APPLICABILITY

According to an aspect of the present disclosure, it is possible to reserve a power transmitting device in consideration of a supply-demand relationship between a facility including the power transmitting device and a vehicle.

REFERENCE SIGNS LIST

1 Information processing system
10 Server
11 Incentive managing unit (determination unit, provision unit, and receiving unit)
12 Reservation requesting unit (request unit)
20 Database group
21 Charging history database
22 User database
23 Facility database
24 Incentive database
30 Facility
31 Facility terminal
32 Power transmitting device
40 User
41 User terminal
50 Vehicle
51 Power receiving device
52 Battery
60 Incentive list
P Information processing program

The invention claimed is:

1. An information processing system comprising at least one processor configured to:
   transmit to a user terminal an incentive list indicating one or more incentives provided by one or more facilities;
   receive from the user terminal an incentive selected from the incentive list by a user of the user terminal; and
   transmit a reservation request for reserving a power transmitting device of a corresponding facility which is the facility corresponding to the selected incentive for a vehicle corresponding to the user, to the corresponding facility;
   wherein the at least one processor is configured to select two or more facilities out of a plurality of facilities and to transmit to the user terminal the incentive list indicating the incentives of at least some facilities of which a facility terminal has transmitted offer information indicating an offer of the incentive in response to transmission of user information of the user to the facility terminal, out of the selected two or more facilities.

2. The information processing system according to claim 1, wherein the at least one processor is further configured to determine whether charging of the vehicle is necessary based on a charging history of the vehicle, and
   wherein the at least one processor is configured to transmit the incentive list to the user terminal when determining that charging is necessary.

3. The information processing system according to claim 2, wherein the at least one processor is configured to estimate at least one attribute of an SOC of a battery of the vehicle, a next charging timing of the vehicle, and a travel distance of the vehicle since previous charging from the charging history and to determine whether charging of the vehicle is necessary based on the estimated at least one attribute.

4. The information processing system according to claim 1, wherein the at least one processor is configured to select one or more facilities out of the plurality of facilities and to transmit to the user terminal the incentive list indicating one or more incentives provided by the selected one or more facilities.

5. The information processing system according to claim 4, wherein the at least one processor is configured to select the one or more facilities based on a geographical positional relationship between the user or the vehicle and the plurality of facilities.

6. The information processing system according to claim 5, wherein the at least one processor is configured to select the facility which is located within a predetermined distance from a position of the user or the vehicle.

7. The information processing system according to claim 5, wherein the at least one processor is configured to select the facility which is located within a predetermined distance from a past moving route of the vehicle.

8. The information processing system according to claim 5, wherein the at least one processor is configured to select the facility which is located in a reachable range of the vehicle.

9. The information processing system according to claim 4, wherein the at least one processor is configured to select the facility corresponding to a user attribute of the user.

10. The information processing system according to claim 1, wherein the at least one processor is configured to transmit the incentive list to the user terminal such that the user terminal outputs the incentive list without inquiring of the user about whether charging of the vehicle is necessary.

11. An information processing system comprising at least one processor configured to:
   transmit to a user terminal an incentive list indicating one or more incentives provided by one or more facilities;
   receive from the user terminal an incentive selected from the incentive list by a user of the user terminal; and
   transmit a reservation request for reserving a power transmitting device of a corresponding facility which is the facility corresponding to the selected incentive for a vehicle corresponding to the user, to the corresponding facility,
   wherein the at least one processor is configured to select one or more facilities out of the plurality of facilities and to transmit to the user terminal the incentive list indicating one or more incentives provided by the selected one or more facilities.

12. An information processing system comprising at least one processor configured to:
   transmit to a user terminal an incentive list indicating one or more incentives provided by one or more facilities;
   receive from the user terminal an incentive selected from the incentive list by a user of the user terminal; and
   transmit a reservation request for reserving a power transmitting device of a corresponding facility which is the facility corresponding to the selected incentive for a vehicle corresponding to the user, to the corresponding facility,
   wherein the at least one processor is configured to transmit the incentive list to the user terminal such that the user terminal outputs the incentive list without inquiring of the user about whether charging of the vehicle is necessary.

\* \* \* \* \*